United States Patent
Janzadeh et al.

(10) Patent No.: US 10,842,594 B2
(45) Date of Patent: Nov. 24, 2020

(54) VIRTUAL MODELING OF GINGIVA ADAPTATIONS TO PROGRESSIVE ORTHODONTIC CORRECTION AND ASSOCIATED METHODOLOGY OF APPLIANCE MANUFACTURE

(71) Applicant: Clearcorrect Operating, LLC, Round Rock, TX (US)

(72) Inventors: Hamed Janzadeh, Austin, TX (US); Eric Tyndall Guenterberg, Boston, MA (US)

(73) Assignee: Clearcorrect Operating, LLC, Round Rock, TX (US)

(*) Notice: Subject to any disclaimer, the term of this patent is extended or adjusted under 35 U.S.C. 154(b) by 831 days.

(21) Appl. No.: 15/603,104

(22) Filed: May 23, 2017

(65) Prior Publication Data

US 2017/0340414 A1 Nov. 30, 2017

Related U.S. Application Data

(60) Provisional application No. 62/340,960, filed on May 24, 2016.

(51) Int. Cl.
  *A61C 7/00* (2006.01)
  *A61C 7/08* (2006.01)

(52) U.S. Cl.
  CPC ............ *A61C 7/002* (2013.01); *A61C 7/08* (2013.01)

(58) Field of Classification Search
  CPC ...... A61C 7/002; A61C 7/08; A61C 2007/004
  See application file for complete search history.

(56) References Cited

U.S. PATENT DOCUMENTS

| | | | |
|---|---|---|---|
| 6,514,074 B1 | 2/2003 | Chishti et al. | |
| 2004/0197728 A1* | 10/2004 | Abolfathi | A61C 7/00 433/24 |
| 2008/0182220 A1 | 7/2008 | Chishti et al. | |
| 2009/0029310 A1* | 1/2009 | Pumphrey | A61C 7/08 433/24 |
| 2009/0098502 A1 | 4/2009 | Andreiko | |
| 2009/0208897 A1 | 8/2009 | Kuo | |

OTHER PUBLICATIONS

International Search Report and Written Opinion issued in PCT Application No. PCT/US2017/034217 dated Aug. 24, 2017.
(Continued)

*Primary Examiner* — Saif A Alhija
(74) *Attorney, Agent, or Firm* — Gardella Grace P.A.

(57) ABSTRACT

A system and associated methodology for the generation of digital models that account for the adaptation of the shape of the patient's gingiva is provided. The exemplary system uses an initial scan of the patient's gingiva as a base model, taking into account the type and morphology of the teeth, the shape, orientation and movements of the roots inside the gingiva, and other factors for a more accurate prediction of the changes in the shape of the gingiva throughout every step of the treatment. In particular, the system proactively determines the areas of the model that will be covered by the aligner and prevents changes to such areas, whereas the shape of the model outside these areas is altered in a way to minimize the size of model and to add any necessary features for the manufacturing of the aligners.

20 Claims, 5 Drawing Sheets

(56) References Cited

OTHER PUBLICATIONS

International Preliminary Report on Patentability issued in PCT Application No. PCT/US2017/034217 dated Nov. 27, 2018.
Extended European Search Report issued in EP Application No. 17803494.8 dated May 7, 2019.
Notice of Acceptance for Patent Application issued in AU Application No. 2017269353 dated May 15, 2019.
Communication under Rule 71(3) EPC issued in EP Application No. 17803494.8 dated Jan. 28, 2020.
Notice of Preliminary Rejection issued in KR Application No. 10-2018-7036929 dated May 12, 2020.

* cited by examiner

VIRTUAL MODELING OF GINGIVA ADAPTATIONS TO PROGRESSIVE ORTHODONTIC CORRECTION AND ASSOCIATED METHODOLOGY OF APPLIANCE MANUFACTURE

CROSS-REFERENCE TO RELATED APPLICATION

This application claims the benefit of U.S. Provisional Application No. 62/340,960, filed May 24, 2016.

BACKGROUND

Orthodontic aligners provide an alternative to traditional braces, which typically employ brackets connected by wires for the realignment of teeth. Aligners are suitable for patients with mildly or moderately crowded teeth, or minor spacing problems between teeth. A patient using aligners for orthodontic treatment periodically replaces the aligner with a new, progressively different aligner to gradually move the teeth from a first position to a second position, and ultimately, toward the desired, final position. The course of treatment may last several months to a couple of years, depending on the severity of the teeth misalignment. Aligners may be made from plastic materials such as acrylic, such as those manufactured by the current assignee, ClearCorrect® LLC of Round Rock, Tex.

The current technologies available for producing plastic aligners used during orthodontic treatment are mainly based on a 3D scanning of the patient's current dentition, planning a course of treatment by defining the movement of the teeth in a computer system, printing the future or anticipated teeth models corresponding to each step of the treatment, and using the models for fabricating plastic aligners by thermoforming the printed models and/or via other manufacturing technologies, such as 3D printing.

One of the biggest challenges in generating the teeth models is predicting and including a realistic 3D model of the patient's gingiva ("gums") for each step of the treatment. When repositioning and moving the teeth during the various stages of treatment in the computer system, the geometrical shape of the teeth does not change, as it is only a solid object moved in finite directions. However, the bones and gingiva do change shape and evolve throughout the treatment. The plastic aligners cover parts of the gingiva as well as the teeth; therefore, to be able to create aligners that will fit properly in the patient's mouth, it is critical to accurately predict and generate precise shapes and dimensions of the gingiva when creating the 3D models of the teeth.

There currently exist various software technologies that assist with generating the gingiva models when the teeth are moved to create a treatment plan. Some of the existing technologies generate completely virtual gingiva shapes with no wrinkles and warping on the surface, but do not accurately represent the realistic shape of the gingiva in the patient's mouth; neither for the initial nor for the future steps of the treatment. Examples of such systems include ClinCheck® by Align Technology of San Jose, Calif. Other systems use the actual shapes of the patient's gingiva as the starting point in the treatment, which makes the initial models fit perfectly, but as the teeth start moving the updates to the gingiva shapes is not accurate, and causes wrinkles in the gingiva shape. Examples of such systems include the Ortho Analyzer by 3Shape® of Copenhagen, Denmark.

These known systems treat the gingiva and teeth geometries as a single mesh that are strictly stitched and attached together. Consequently, these systems update the gingiva shape in a way that will not match the actual gingiva changes in the patient's mouth as the teeth are repositioned. As a result, even though the aligners from the initial steps of the treatment fit properly, the inaccurate updates to the gingiva shapes will cause the aligners for the later steps of the treatment to progressively deteriorate in fit.

SUMMARY

One of the most important steps in orthodontic treatment when using aligners is the prediction and generation of precise 3D teeth models for every step of the treatment plan. To generate such models, the future placement of the teeth and the future dimension/shape of the adapting gingiva need to be predicted accurately. An exemplary embodiment of the present invention provides a system and associated methodology for the generation of digital models that account for the adaptation of the shape of the patient's gingiva based on the treatment plan, patient records and the dental morphology. The exemplary system uses an initial scan of the patient's gingiva as a base model, taking into account the type and morphology of the teeth, the shape, orientation and movements of the roots inside the gingiva, and other factors for a more accurate prediction of the changes in the shape of the gingiva throughout every step of the treatment. In particular, the system proactively determines the areas of the model that will be covered by the aligner and prevents changes to such areas, whereas the shape of the model outside these areas is altered in a way to minimize the size of model and to add any necessary features for the manufacturing of the aligners The methodology generates and updates the dimension/shape of the gingiva, resulting in more precise models of the gingiva. The ability to account for adaptation of the shape of the gingiva during orthodontic treatment enhances aligner fitting, decreasing re-work on parts of the dentition.

In the current inventive system, individual teeth are treated as separate objects that are floating inside the gingiva. Information such as the type and placement of the teeth, morphology of the roots, and the type of the root movements inside the bone is used to create a force field vector between the root models and the gingiva. Finite element analysis methods are then used to calculate the updated shape of the gingiva. Statistical data is also assessed and used to fine tune the parameters related to forces defined between the roots and the gingiva. As a result, a realistic model for how teeth movements affect the changes in the gingiva dimension/shape is created. Further, the corresponding aligners generated from each of these models fit properly in both the initial and later steps of the treatment.

Aspects of an exemplary embodiment of the present invention include: a) receiving an initial oral profile, including teeth and gingiva spatial information, of a patient, b) generating an initial mold profile from the oral profile, wherein the initial mold profile includes numerical representations of the teeth and gingiva spatial information of the patient, c) assigning a plurality of tooth control points and a plurality of gingiva control points to the initial mold profile, d) identifying a first force field vector for a first gingiva control point based on a movement of a neighboring control point in a first group of neighboring gingiva and tooth control points, wherein the first gingiva control point is a member of the plurality of gingiva control points, e) repeating step d) to identify the remaining force field vectors for the first gingiva control point based on movements of remaining control points in the first group of neighboring gingiva and tooth control points, f) repeating steps d) and e) for the remaining gingiva control points in the plurality of gingiva control points, g) receiving tooth control points movements for the plurality of tooth control points, h) performing finite element analysis to calculate the movements of the plurality of gingiva control points in response to the received tooth control points movements, and i) generating a new mold profile.

The area of the gingiva that will be covered by the aligner is detected and accurately preserved, while the shape of the model outside this area is altered in a way to minimize the size of model and to add any necessary features for the manufacturing of the aligners. Among different possibilities for creating the base model one includes using an optimization algorithm, one that minimizes the volume of the 3D model is selected while respecting criteria on the height of the base in different areas of the model. This leads to minimal consumption of printing materials during printing of the 3D teeth models.

With more accurate models for predicting the change in shape of the gingiva during orthodontic treatment, aligners can be fabricated that both cover some areas of the gingiva and fit properly in the patient's mouth. This will lead to structurally robust aligners and success in moving teeth while doing orthodontic treatment using clear plastic aligners.

DETAILED DESCRIPTION

The present application describes a system and method for generating digital models that account for the adaptation of the shape of the patient's gingiva during orthodontic treatment. The initial teeth and gingiva profile is obtained from a 3-D scanning of the patient's teeth and gingiva replica, or a CT scan of the patient's teeth and gingiva impression. The initial profile, along with desired teeth movements, is sent to software that produces a new teeth and gingiva profile. The software assigns, based on collected statistical and anatomical data, force vectors between a number of gingiva control points and tooth control points. Each force vector represents the impact of a tooth gingiva control point movement on a neighboring gingiva control point. By integrating the desired teeth movements with the initial profile, the software is able to produce a new profile that includes the desired teeth movements and new gingiva topology. The new profile may be sent to a 3-D printer to fabricate a new mold.

Figure 1:
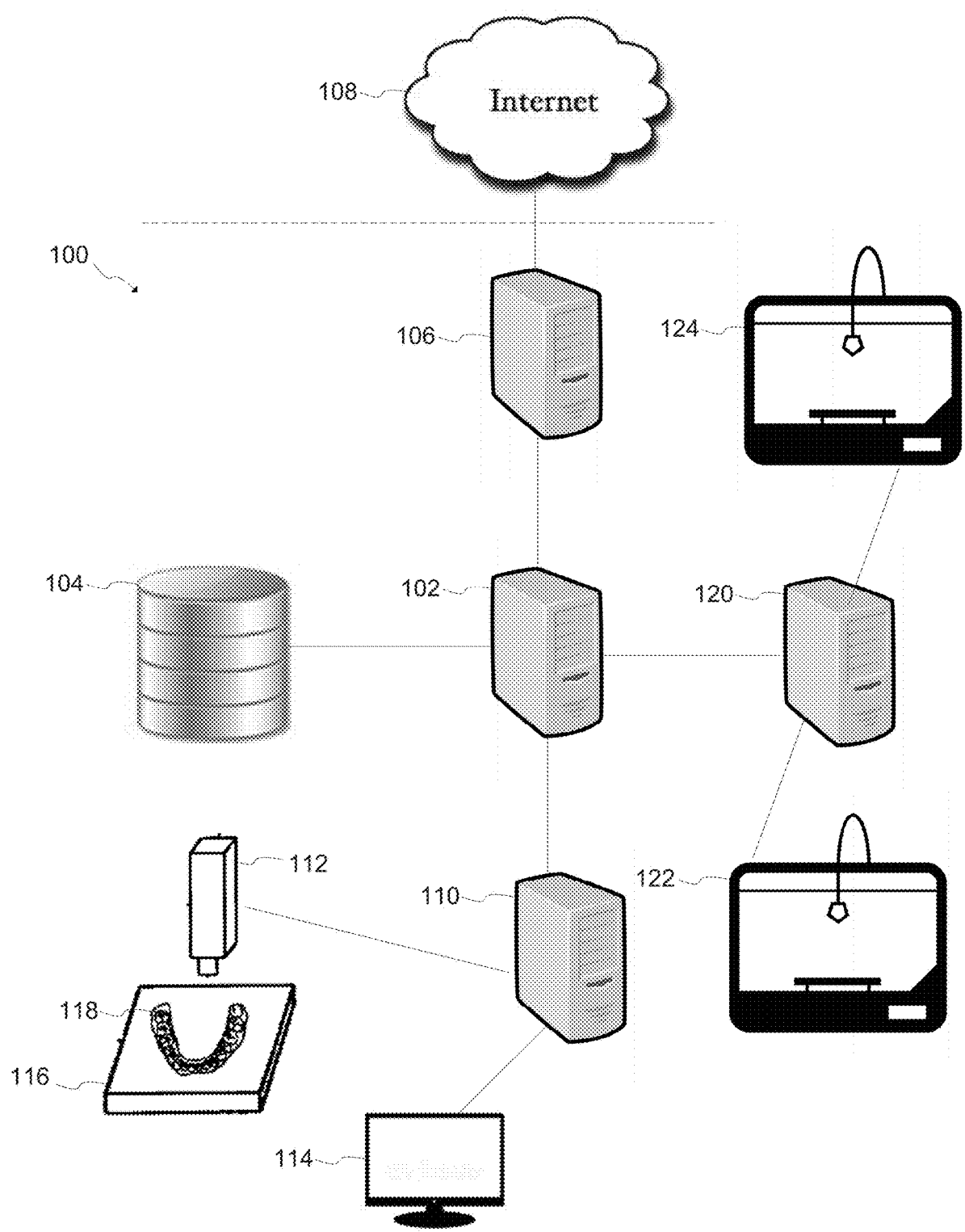
FIG. 1 shows an exemplary embodiment of a system for generating digital models that account for the adaptation of the shape of the patient's gingiva.

FIG. 1 shows an exemplary system 100 for generating digital models that account for the adaptation of the shape of the patient's gingiva during orthodontic treatment. The system 100 includes a central server 102, a database 104, a physician portal 106, a scanning computer 110, and a printing computer 120. The physical portal 106 may be connected to the Internet 108. The system 100 may be implemented on multiple computers, or integrated on a single computer.

In some implementation, the central server 102 may be connected to the database 104, the physician portal 106, the scanning computer 110, and the printing computer 120. The central server 102 provides an interface for the remaining systems to properly and safely access the database 104. The central server 102, the database 104, the physician portal 106, the scanning computer 110, and the printing computer 120 may be placed geographically in the same location. Alternatively, some or all of the components may communicate remotely via a virtual private network.

In certain embodiments, the physician portal 106 may provide external users an interface for sending and receiving digital files to the central server 102. The physician portal 106 may include a proxy server or a firewall to regulate remote access and protects the system 100 from hostile network intrusion. External users may transmit digital files to the physician portal 106 across the internet 108. With proper authorization and authentication, the physician portal 106 may grant certain external users limited access to the scanning computer 110 and the printing computer 120.

In exemplary embodiments, the database 104 may store digital data used within the system 100. The stored data may be provided via the central server 102. The database 104 may implement local and/or remote routine back-up features for stored data.

In some embodiments, the scanning computer 110 may be connected to an image capturing device 112 and an image output device 114. The image capturing device 112 may scan a mold 118 representing a replica of a patient's teeth and gingiva profile placed on a positioner 116. The image output device 114, such as a screen, a monitor, a display, a projector or a printer, for example, may display the scanned image of the mold 118. The image capturing device 112 may include 3D camera, two or more 2D cameras, CT scanner, or x-rays. Other devices for obtaining images are possible.

In exemplary implementations, the positioner 116 includes a visual reference guide comprising lines that are on or within the positioner. The visual reference guide may be utilized to track locations of the mold within the positioner 116.

In certain implementations, the printing computer 120 may be connected to a mold fabricating device 122 and an aligner fabricating device 122. The mold fabricating device 122 and the aligner fabricating device 124 may be 3D printers, for example.

Figure 2:
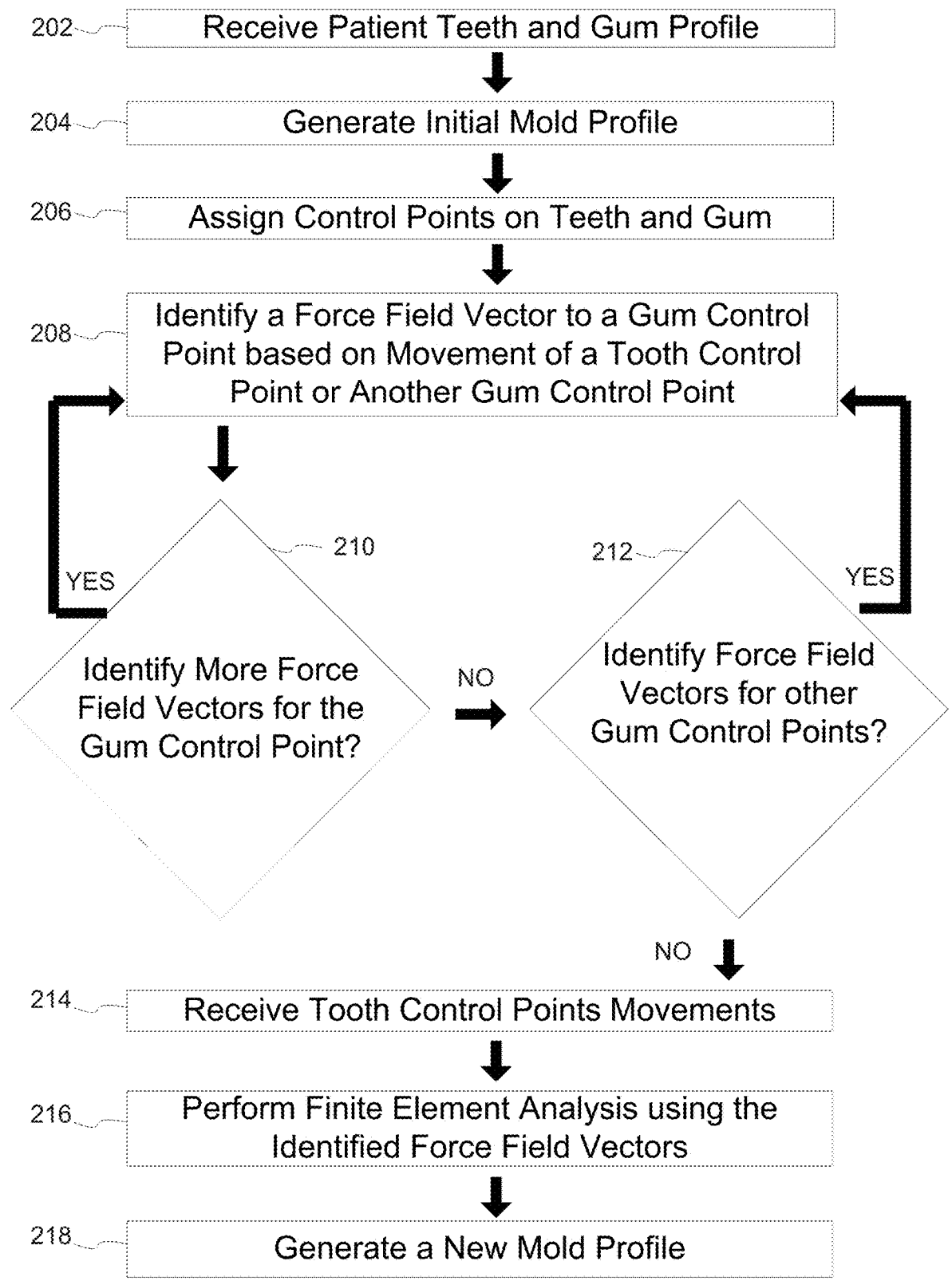
FIG. 2 is a flow chart of an exemplary embodiment of a method for generating digital models that account for the adaptation of the shape of the patient's gingiva.

FIG. 2 is a flow chart illustrating an exemplary method 200 for generating digital models that account for the adaptation of the shape of the patient's gingiva during orthodontic treatment, which may be used to produce orthodontic aligners. The central server 102 first receives (202) patient teeth and gingiva profile from the scanning computer or a remote source. For example, the scanning computer 110 may rely on the image capturing device 112 to photogrammetrically collect spatial information about the mold 118. In certain embodiments, the scanning computer 110 may utilize a 3-D scanner to capture spatial information relating to the mold 118. The 3-D scanner may be contact-based or optics-based. Alternatively, the scanning computer 110 may use a CT computerized tomography (CT) scanner to piece-wise scan an impression of the patient teeth and gingiva. The scanning computer 110 integrates a plurality of x-ray images obtained from the CT scan to construction the patient teeth and gingiva profile. At the completion of the 3D or CT scan, a pre-processing may be performed on the scanned image to ensure compatibility with the central server 102.

In other embodiments, the central server 102 may receive (202) patient teeth and gingiva profile in digital format from a remote system via the physician portal 106. The profile may be sent to the physician portal 106 over the internet 108 by an orthodontist that directly extracted the profile from the patient. The profile may be stored on the database 104. Alternatively, the central server 102 may obtain the profile from the database 104. Other methods of receiving teeth and gingiva profile data are possible.

In certain implementations, after receiving the patient teeth and gingiva profile, the central server 102 may generate (204) the initial mold profile. The initial mold profile includes sufficient spatial information for the system 100 to, if necessary, produce a reproduction mold identical to the mold representing the patient's teeth and gingiva profile. The generated initial mold profile may be digitally stored by the system 100 either locally (on the database 104) or remotely.

Figure 3:
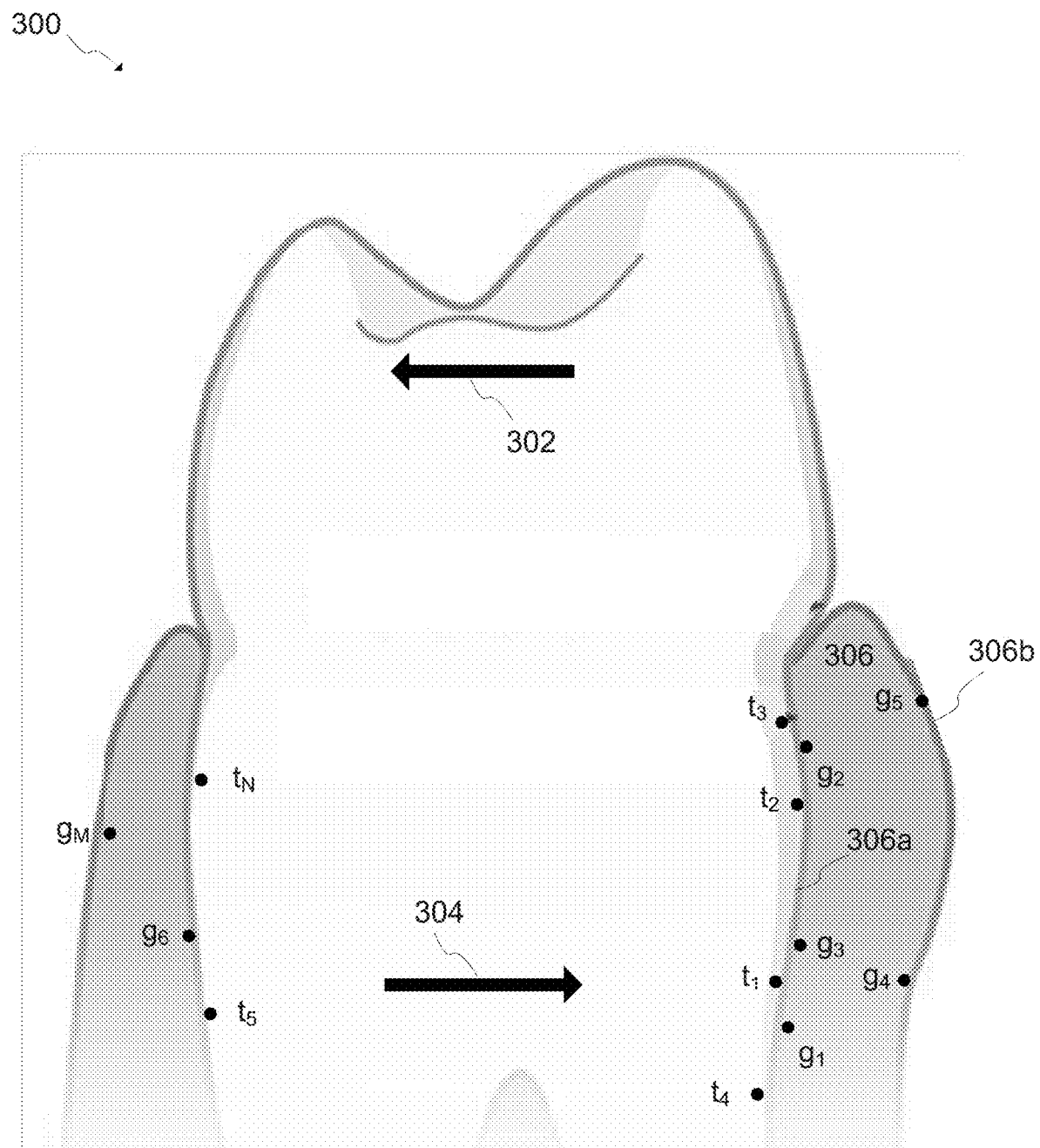
FIG. 3 illustrates an exemplary cross sectional view of a tooth and gingiva profile.

FIG. 3 illustrates an exemplary cross sectional view of a tooth and gingiva profile 300. Referring to FIGS. 2 and 3, in some embodiments, the central server 102 assigns (206) numerous control points on the teeth and the gingiva of the initial mold profile. Each control point represents a spatial point on the surfaces of the teeth or the gingiva. The number of assigned control points for the initial mold profile may be 100, 200, 500, 1000, 2000, 5000, 10000, 20000, 50000, or 100000. Other numbers of control points are possible dependent upon the specific treatment and desired accuracy.

In some implementations, the central server 102 may assign gingiva control points to surfaces of an inner wall 306a and an outer wall 306b of a gingiva 306. In other embodiments, the central server 102 may assign gingiva control points to the surfaces of the inner wall 306a and the outer wall 306b of the gingiva 306 and within the gingiva 306.

The central server 102 may provide a coordinate system to numerically represent each control point. Exemplary coordinate systems include Cartesian coordinate, cylindrical coordinate, and spherical coordinate. Other coordinate systems may be used.

Still referring to FIGS. 2 and 3, in exemplary embodiments, the central server 102 identifies (208) a first force field vector $f(g_1, t_1)$ to a first gingiva control point $g_1$ relating to a first tooth control point $t_1$. The first gingiva control point $g_1$ is near the inner wall 306a of the gingiva 306. The first tooth control point $t_1$ may represent a spatial point on a surface of a lower portion of a first tooth. Alternatively, the first tooth control point $t_1$ may represent a spatial point on other portions of the first tooth. The first force field vector represents a movement of the first gingiva control point $g_1$ in response to a movement of the first tooth control point $t_1$. For example, if an upper portion of the first tooth moves inwardly 302 (i.e. toward the middle of the mold), the lower portion of the first tooth may move outwardly 304 (i.e. away from the middle of the mold). Consequently, the first tooth control point moves $t_1$ outwardly. This outward movement of the first tooth control point $t_1$ may cause the first gingiva control point $g_1$ to move outwardly. The first force field vector represents the movement of the first gingiva control point $g_1$ in response to the movement of the first tooth control point $t_1$. In other exemplary embodiments, the central server 102 may identify (208) a different force field vector to the first gingiva control point $g_1$ relating to a different neighboring tooth control point, such as tooth control points $t_2$, $t_3$, or $t_4$.

Still referring to FIGS. 2 and 3, in some embodiments, the central server 102 may also identify (208) a force field vector for the first gingiva control point $g_1$ that represents the movement of the first gingiva control point $g_1$ in response to the movement of a neighboring gingiva control point. For the first gingiva control point the central server 102 may identify force field vectors $f(g_1, g_2)$, $f(g_1, g_3)$ relating to movements of gingiva control points $g_2$ and $g_3$, or alternatively, identify force field vectors $f(g_1, g_2)$, $f(g_1, g_3)$, $f(g_1, g_4)$ relating to movements of gingiva control points $g_2$, $g_3$, and $g_4$. In the first scenario, the central server 102 identifies force field vectors relating to neighboring gingiva control points on the inner wall 306a of the gingiva 306. In the second scenario, the central server 102 identifies force field vectors relating to neighboring gingiva control points on the inner wall 306a and the outer wall 306b of the gingiva 306. Other criteria for selecting neighboring gingiva control points are possible.

As shown in FIGS. 2 and 3, in certain implementations, the central server 102 may identify (210) more force field vectors for the first gingiva control point $g_1$. An exemplary set of force field vectors for the first gingiva control point $g_1$ may include $f(g_1, t_1)$, $f(g_1, t_2)$, $f(g_1, t_3)$, $f(g_1, t_4)$, $f(g_1, g_2)$, and $f(g_1, g_3)$. Another exemplary set of force field vectors for the first gingiva control point $g_1$ may include $f(g_1, t_1)$, $f(g_1, t_2)$, $f(g_1, t_3)$, $f(g_1, t_4)$, $f(g_1, g_2)$, $f(g_1, g_3)$, and $f(g_1, g_4)$. Yet another exemplary set of force field vectors for the first gingiva control point $g_1$ may include $f(g_1, t_1)$, $f(g_1, t_4)$, and $f(g_1, g_3)$. Still another exemplary set of force field vectors for the first gingiva control point $g_1$ may include $f(g_1, t_1)$, $f(g_1, t_4)$, $f(g_1, g_3)$, and $f(g_1, g_4)$. An exemplary set of force field vectors for the first gingiva control point $g_1$ may include $f(g_1, t_1)$, $f(g_1, t_4)$, $f(g_1, g_2)$, and $f(g_1, g_3)$. A further exemplary set of force field vectors for the first gingiva control point $g_1$ may include $f(g_1, t_1)$, $f(g_1, t_4)$, $f(g_1, g_2)$, $f(g_1, g_3)$, and $f(g_1, g_4)$. Another exemplary set of force field vectors for the first gingiva control point $g_1$ may include $f(g_1, t_1)$, $f(g_1, t_2)$, $f(g_1, t_3)$, ... $f(g_1, t_N)$, $f(g_1, g_2)$, $f(g_1, g_3)$, and $f(g_1, g_4)$, where N is a positive integer. Yet another exemplary set of force field vectors for the first gingiva control point $g_1$ may include $f(g_1, t_1)$, $f(g_1, t_2)$, ..., $f(g_1, t_N)$, $f(g_1, g_2)$, $f(g_1, g_3)$, ... and $f(g_1, g_M)$, where M is a positive integer that may be the same or different than N. Other combinations for the set are possible.

Next, referring to FIGS. 2 and 3, the central server 102 may identify (212) force field vectors for other gingiva control points. For example, for gingiva control points $g_2$, $g_3$, $g_4$, ... $g_M$ and tooth control points $t_1$, $t_2$, $t_3$, ... $t_N$, the central server 102 identifies force vectors $f(g_2, t_1)$, $f(g_2, t_2)$, $f(g_2, t_3)$, ... $f(g_2, t_N)$, and $f(g_2, g_1)$, $f(g_2, g_3)$, $f(g_2, g_4)$, ... $f(g_2, g_M)$ to gingiva control point $g_2$, $f(g_3, t_1)$, $f(g_3, t_2)$, $f(g_3, t_3)$, ... $f(g_3, t_N)$, and $f(g_3, g_1)$, $f(g_3, g_2)$, $f(g_3, g_4)$, ... $f(g_3, g_M)$ to gingiva control point $g_3$, $f(g_4, t_1)$, $f(g_4, t_2)$, $f(g_4, t_3)$, ... $f(g_4, t_N)$, and $f(g_4, g_1)$, $f(g_4, g_2)$, $f(g_4, g_3)$, ... $f(g_4, g_M)$ to gingiva control point $g_4$, ... and $f(g_M, t_1)$, $f(g_M, t_2)$, $f(g_M, t_3)$, ... $f(g_M, t_N)$, and $f(g_M, g_1)$, $f(g_M, g_2)$, $f(g_M, g_3)$, ..., $f(g_M, g_{M-1})$ to gingiva control point $g_M$, where subscripts M and N are positive integers that are the same or different. In other embodiments, the central server 102 may identify subsets of the force field vectors for gingiva control points as explained above.

For each gingiva control point $g_1$, $g_2$, $g_3$, ... $g_M$, the central server 102 identifies a set of L vectors that represent the movement of each gingiva control point in response to the movements of the tooth control points $t_1$, $t_2$, $t_3$, ... $t_N$, and the gingiva control points $g_1$, $g_2$, $g_3$, $g_4$, ... $g_M$, where L≤M+N. In certain embodiments, some of the vectors may be expressed as algebraic equations. Other mathematical expressions are possible.

In certain embodiments, the force field vectors may be identified using statistical data stored within the database 104. The statistical data may be related to previous orthodontic operations, orthodontic research data, patients anatomic record, and computer simulations.

Referring to FIG. 2, in exemplary implementations, the central server 102 receives (214) tooth control points movements for tooth control points $t_1$, $t_2$, $t_3$, $t_N$. The tooth control points movements may be entered manually by an operator into the central server 102 via the graphical user interface. Another exemplary method for the central server 102 to receive (214) tooth control points movements is to receive the tooth control points movements from a remote system through the physician portal 106. An orthodontist at the remote system may input the desired tooth control points movements into a digital file. The movements may represent the desired locations for the teeth of the patient associated with the initial teeth and gingiva profile. The distance between any two tooth control points for a same tooth may remain constant (i.e. each tooth moves as a fixed, solid unit). Alternative, central server 102 may allow small changes in the shape of tooth in response to the tooth control points movements.

In certain embodiments, after receiving the tooth control points movements, the central server 102 performs (216) finite element analysis (FEA) using the identified force field vectors. Based on the individual movements of the associated tooth control points and the identified force field vectors, the central server 102 may compute the overall movement of each gingiva control point. By using FEA, the central server 102 may estimate the movement of a gingiva, or a portion of the gingiva, based on the movements of the control points on or within the gingiva. For example, the central server 102 may approximate the movement of the inner wall 306a using the average movements of the gingiva control points $g_1$, $g_3$, and $g_3$. In another example, the central server 102 may approximate the movement of a first portion of the inner wall 306a between the gingiva control points $g_1$ and $g_3$ using the average movements of the gingiva control points $g_1$ and $g_3$. Alternatively, the central server 102 may estimate the first portion of the inner wall 306a between $g_1$ and $g_3$ by assuming a point between $g_1$ and $g_3$ moves according to a weighted average of $g_1$ and $g_3$. For example, assuming a distance of x from $g_1$ to $g_3$, and the point is 0.4x from $g_1$, than the movement of the point may be 0.6 (movement of $g_1$)+0.4 (movement of $g_3$) in yet another example, the movement of a second portion of the gingiva 306 bordered by gingiva control points $g_1$, $g_3$ and $f_4$ may be approximated by averaging the movements of $g_1$, $g_3$ and $g_4$. Other methods of approximations are possible.

Figure 4:
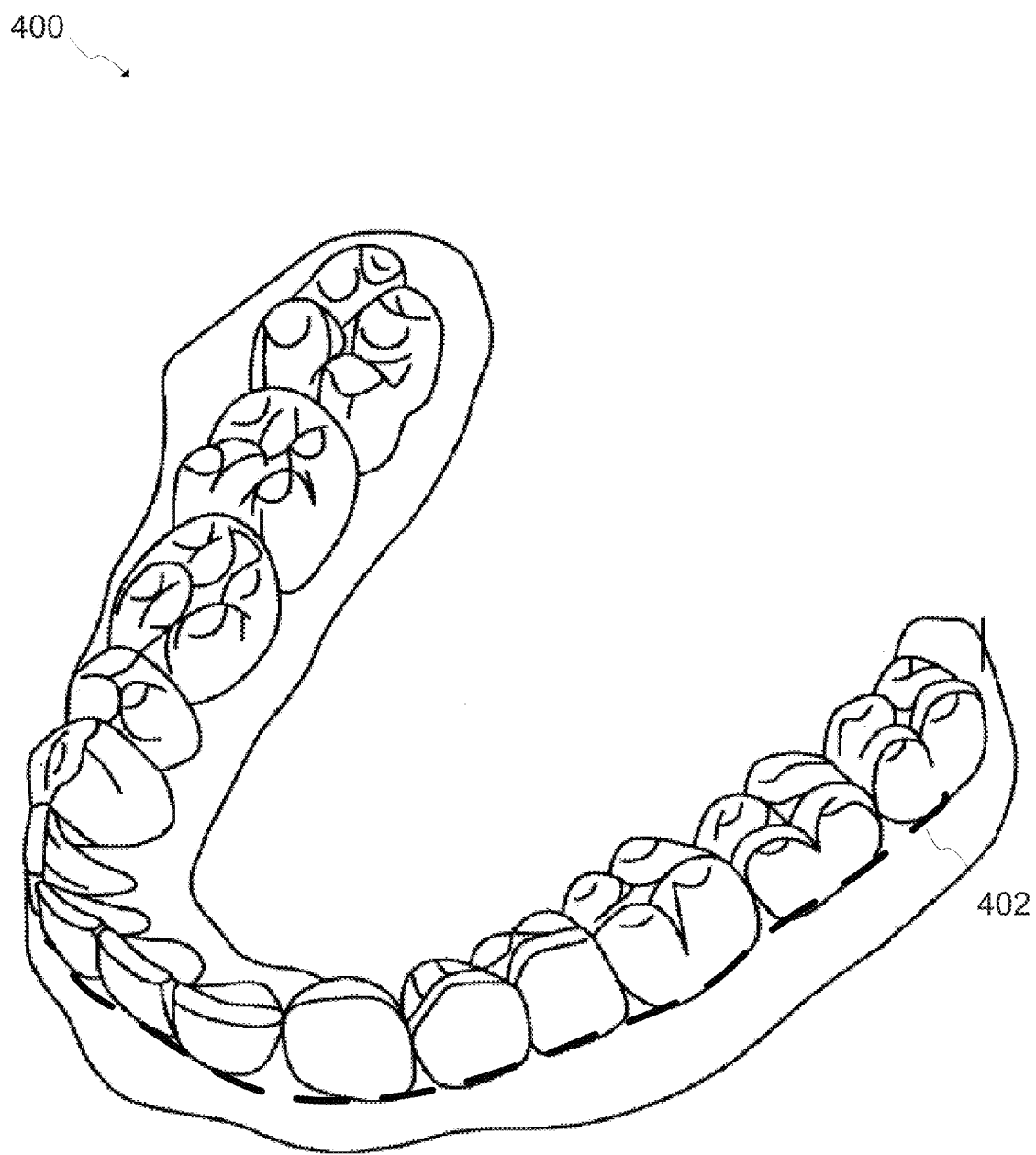
FIG. 4 illustrates a perspective view of a mold made using the method described in FIG. 2.
Figure 5:
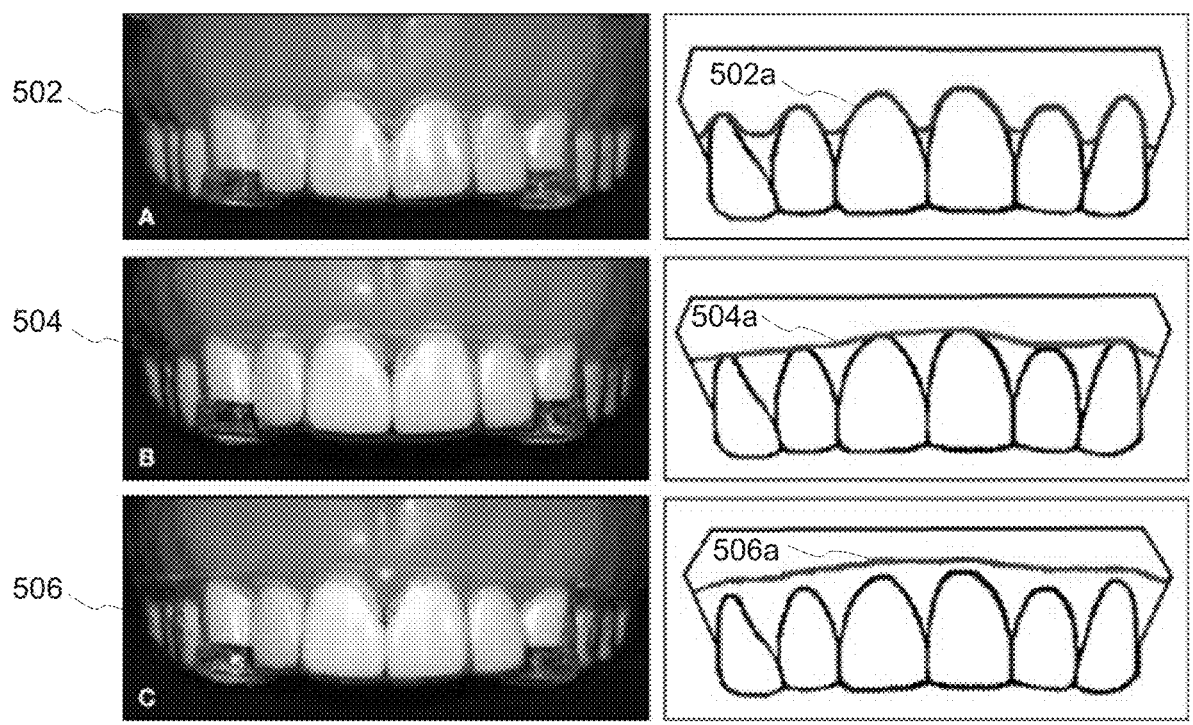
FIG. 5 illustrates frontal views of exemplary aligners.

Referring now to FIGS. 2, 4, and 5, after performing the finite element analysis of the assigned gingiva control points, in exemplary embodiments, the central server 102 generates (218) a new mold profile including the movements of the teeth and gingiva. The new mold profile may be used to generate a new mold 400, which in turn may be used to produce a new aligner for the patient associated with the initial teeth and gingiva profile. The new aligner, if worn by the patient, may gradually move his/her teeth to locations similar to the teeth locations in the new mold profile. A complete treatment plan may include 5, 10, 20, 50, and 100 aligners. Other numbers of aligners are possible.

In exemplary embodiments, the central server 102 may send the new mold profile to the printing computer 120 for generating the new mold 400. The printing computer 120 may instruct the mold fabricating device 122 to produce the new mold 400 based on the new mold profile.

In some embodiments, the new mold profile may be stored in the database 104. Alternatively, the system 100 may send the new mold profile, via the physician portal 106, to a remote system.

The new mold 400 produced by the mold fabricating device 122 of the system 100 using the new mold profile may include replica of teeth and gingiva. In some implementations, the gingiva may extend 2 millimeters from a gingival line 402. Alternatively, the gingiva may extend 1 millimeter, 3 millimeters, 5 millimeters, 10 millimeters, or 15 millimeters from the gingival line 402.

Referring to now to FIG. 5, the new mold 400 may be utilized by the system 100 to produce a new aligner using the aligner fabricating device 124. In some embodiments, a first aligner 502 may be produced using the new mold 400, where the first aligner includes a contoured edge 502a. Alternatively, a second aligner 504 may be produced using the new mold 400, where the second aligner includes a flushed edge 504a, In another example, a third aligner 506 may be produced by the system using the new mold 400, where the third aligner includes an extended edge 506a. Other designs for the edge of the aligner is possible.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

The invention claimed is:

1. A method comprising:
   a) receiving, by processing circuitry of a server, an oral profile including teeth and spatial information for a gingiva topology of a patient;
   b) generating, by the processing circuitry, an initial mold profile from the oral profile, wherein the initial mold profile includes numerical representations of the teeth and the gingiva topology of the patient;
   c) assigning, by the processing circuitry, a plurality of tooth control points and a plurality of gingiva control points to the initial mold profile, wherein:
      each of the plurality of gingiva control points is a discrete spatial point dispersed at a surface of gingiva of the initial mold profile, and
      each of the plurality of tooth control points is disposed on a surface of a respective tooth of the teeth of the initial mold profile, wherein each of the plurality of tooth control points is a discrete spatial point on a surface of the first tooth,
   d) identifying, by the processing circuitry, a force field vector for a first gingiva control point based on a movement of a neighboring control point in a first group of neighboring gingiva and tooth control points, wherein the first gingiva control point is a member of the plurality of gingiva control points, wherein the first group of neighboring gingiva and tooth control points include any of the plurality of gingiva control points and any of the plurality of tooth control points for which movement of the respective control point causes a responsive movement of the first gingiva control point on the initial mold profile;

e) repeating, by the processing circuitry, step d) to identify remaining force field vectors for the first gingiva control point based on movements of remaining control points in the first group of neighboring gingiva and tooth control points;

f) repeating, by the processing circuitry, steps d) and e) for remaining gingiva control points in the plurality of gingiva control points;

g) receiving, by the processing circuitry, movements of a portion of a plurality of the teeth in a treatment plan for the patient, wherein
the movements of the portion of the plurality of teeth include movements of respective tooth control points on the portion of the plurality of teeth;

h) determining, by the processing circuitry responsive to determining the movements of the portion of the plurality of the teeth, an updated version of the gingiva topology for the patient based on an impact of the movements of the portion of the plurality of teeth on the identified force field vector for the respective gingiva control point, wherein
determining the updated version of the gingiva topology includes performing finite element analysis for each of the plurality of gingiva control points using the identified force field vector for the respective gingiva control point; and i) generating, by the processing circuitry, a new mold profile based on the movements of the portion of the plurality of teeth and the updated version of the gingiva topology.

2. The method of claim 1, further comprising producing a mold using the new mold profile.

3. The method of claim 2, wherein the mold includes gingiva 2 millimeters from a gingival line of the patient.

4. The method of claim 2, further comprising producing an aligner using the mold, wherein the aligner includes an extended edge at least 2 millimeters from a gingival line of the patient.

5. The method of claim 1, wherein receiving the oral profile further comprises receiving the oral profile from a remote computer.

6. The method of claim 1, wherein receiving the oral profile further comprises 3-D scanning an initial mold of the patient.

7. The method of claim 1, further comprising repeating steps a) to i) at least six times to produce six different mold profiles.

8. The method of claim 7, further comprising:
producing six molds from the six different mold profiles, and
producing six aligners from the six molds.

9. The method of claim 1, wherein determining the updated version of the gingiva topology of the patient further comprises estimating a movement of a portion of the gingiva topology of the patient by:
computing movements of a set of gingiva control points bordering the portion of the gingiva topology of the patient, wherein the plurality of gingiva control points includes the set of gingiva control points; and
averaging the movements of the set of gingiva control points.

10. The method of claim 1, wherein determining the updated version of the gingiva topology of the patient further comprises estimating a movement of a portion of the gingiva topology of the patient by:
computing movements of a set of gingiva control points bordering the portion of the gingiva topology of the patient, wherein the plurality of gingiva control points includes the set of gingiva control points; and
computing weighted average movements of sampling points within the portion of the gingiva topology using the movements of the set of gingiva control points.

11. A non-transitory computer readable medium having instructions stored thereon, wherein the instructions, when executed by a processor, cause the processor to:

a) receive an oral profile including teeth and spatial information for a gingiva topology of a patient;

b) generate an initial mold profile from the oral profile, wherein the initial mold profile includes numerical representations of the teeth and the gingiva topology of the patient;

c) assign a plurality of tooth control points and a plurality of gingiva control points to the initial mold profile, wherein:
each of the plurality of gingiva control points is a discrete spatial point dispersed at a surface of gingiva of the initial mold profile, and
each of the plurality of tooth control points is disposed on a surface of a respective tooth of the teeth of the initial mold profile, wherein each of the plurality of tooth control points is a discrete spatial point on a surface of the first tooth, d) identify a force field vector for a first gingiva control point based on a movement of a neighboring control point in a first group of neighboring gingiva and tooth control points, wherein the first gingiva control point is a member of the plurality of gingiva control points, wherein the first group of neighboring gingiva and tooth control points include any of the plurality of gingiva control points and any of the plurality of tooth control points for which movement of the respective control point causes a responsive movement of the first gingiva control point on the initial mold profile;

e) repeat step d) to identify remaining force field vectors for the first gingiva control point based on movements of remaining control points in the first group of neighboring gingiva and tooth control points;

f) repeat steps d) and e) for remaining gingiva control points in the plurality of gingiva control points;

g) receive movements of a portion of a plurality of the teeth in a treatment plan for the patient, wherein
the movements of the portion of the plurality of teeth include movements of respective tooth control points on the portion of the plurality of teeth;

h) determine, responsive to determining the movements of the portion of the plurality of the teeth, an updated version of the gingiva topology for the patient based on an impact of the movements of the portion of the plurality of teeth on the identified force field vector for the respective gingiva control point, wherein
determining the updated version of the gingiva topology includes performing finite element analysis for each of the plurality of gingiva control points using the identified force field vector for the respective gingiva control point; and i) generate a new mold profile based on the movements of the portion of the plurality of teeth and the updated version of the gingiva topology.

12. The computer readable medium of claim 11, further comprising instructions, when executed by the processor, cause the processor to receive the oral profile from a remote computer.

13. The computer readable medium of claim 11, further comprising instructions, when executed by the processor, cause the processor to receive the oral profile from a 3-D scanning of an initial mold of the patient.

14. The computer readable medium of claim 11, further comprising instructions, when executed by the processor, cause the processor to repeat steps a) to i) at least six times to produce six different mold profiles.

15. The computer readable medium of claim 11, wherein determining the updated version of the gingiva topology of the patient comprises estimating a movement of a portion of the gingiva topology of the patient by:
  computing movements of a set of gingiva control points bordering the portion of the gingiva topology of the patient, wherein the plurality of gingiva control points includes the set of gingiva control points; and
  averaging the movements of the set of gingiva control points.

16. The computer readable medium of claim 11, wherein determining the updated version of the gingiva topology of the patient comprises estimating a movement of a portion of the gingiva topology of the patient by:
  computing movements of a set of gingiva control points bordering the portion of the gingiva topology of the patient, wherein the plurality of gingiva control points includes the set of gingiva control points; and
  computing weighted average movements of sampling points within the portion of the gingiva topology using the movements of the set of gingiva control points.

17. A method comprising:
  a) defining a plurality of gingiva control points dispersed at surfaces of a gingiva topology and a plurality of tooth control points dispersed on a first tooth within an initial mold profile, wherein
    each of the plurality of gingiva control points is a discrete spatial point on the gingiva topology of the initial mold profile, and
    each of the plurality of tooth control points is disposed on a surface of a respective tooth of the teeth of the initial mold profile, wherein each of the plurality of tooth control points is a discrete spatial point on a surface of the first tooth;
  b) identifying a force field vector for a first gingiva control point based on a movement of a first neighboring control point in a first group of neighboring gingiva and tooth control points, wherein the first gingiva control point is a member of the plurality of gingiva control points, wherein the first group of neighboring gingiva and tooth control points include any of the plurality of gingiva control points and any of the plurality of tooth control points for which movement of the respective control point causes a responsive movement of the first gingiva control point on the initial mold profile;
  c) repeating step b) to identify at least one additional force field vector for the first gingiva control point based on a movement of a second neighboring control point in the first group of neighboring gingiva and tooth control points;
  d) repeating step b) and c) for at least a second gingiva control point in the plurality of gingiva control points;
  e) receiving movements of a portion of a plurality of the teeth in a treatment plan for the patient, wherein
    the movements of the portion of the plurality of teeth include movements of respective tooth control points on the portion of the plurality of teeth;
  f) determining, responsive to determining the movements of the portion of the plurality of the teeth, an updated version of the gingiva topology for the patient based on an impact of the movements of the portion of the plurality of teeth on the identified force field vector for the respective gingiva control point, wherein
    determining the updated version of the gingiva topology includes performing finite element analysis for each of the plurality of gingiva control points using the identified force field vector for the respective gingiva control point; and
  g) generating a new mold profile based on the movements of the portion of the plurality of teeth and the updated version of the gingiva topology.

18. The method of claim 17, further comprising producing a mold using the new mold profile.

19. The method of claim 18, wherein the mold includes gingiva 2 millimeters from a gingival line of a patient.

20. The method of claim 18, further comprising producing an aligner using the mold, wherein the aligner includes an extended edge at least 2 millimeters from a gingival line of a patient.

* * * * *